United States Patent [19]
Jensen

[11] Patent Number: 4,998,035
[45] Date of Patent: Mar. 5, 1991

[54] METHOD FOR ATTACHING A MOTOR LEAD RESTRAINT DEVICE TO A COMPRESSOR PUMP

[75] Inventor: Gunther T. Jensen, Tyler, Tex.

[73] Assignee: American Standard Inc., New York, N.Y.

[21] Appl. No.: 558,732

[22] Filed: Jul. 26, 1990

[51] Int. Cl.⁵ .................. H02K 11/00; F04B 39/14
[52] U.S. Cl. .................................. 310/91; 310/71; 439/470
[58] Field of Search .................... 310/71, 89, 91; 439/464, 465, 467, 470, 471

[56] References Cited

U.S. PATENT DOCUMENTS

| | | | |
|---|---|---|---|
| 1,320,798 | 11/1919 | Salambo | 235/90 X |
| 2,513,219 | 6/1950 | Tweed | 235/90 X |
| 3,347,460 | 10/1967 | Dickson | 235/90 |
| 3,462,075 | 8/1969 | Dirk et al. | 230/232 |
| 3,905,547 | 9/1975 | Cyre | 235/90 |
| 4,236,092 | 11/1980 | DiFlora | 310/68 |
| 4,332,386 | 6/1982 | Townsend | 273/148 A |
| 4,396,359 | 8/1983 | Kropiwnicki | 417/312 |
| 4,477,719 | 10/1984 | Watterson | 235/90 |
| 4,521,675 | 6/1985 | Yakich | 235/90 |
| 4,526,435 | 7/1985 | Borne et al. | 439/470 |
| 4,965,478 | 10/1990 | Kobayashi et al. | 310/71 |

Primary Examiner—Steven L. Stephan
Assistant Examiner—D. L. Rebsch
Attorney, Agent, or Firm—William J. Beres; William O'Driscoll

[57] ABSTRACT

A method of trapping a piece in a void formed between two machine parts of refrigeration system compressor so as to restrain a motor lead. The method comprises the steps of placing the piece in a portion of the void formed by a first machine part, completing the void by engaging a second machine part to the first machine part thereby trapping the piece, and attaching a motor lead to an external restraint portion of the piece.

22 Claims, 4 Drawing Sheets

METHOD FOR ATTACHING A MOTOR LEAD RESTRAINT DEVICE TO A COMPRESSOR PUMP

BACKGROUND OF THE INVENTION

The present invention is directed to a hermetically sealed motor compressor for a refrigeration system, and more particularly is directed to a motor lead restraint for restraining a motor lead to the compressor motor housing.

The compressor is operably connected to a motor by a common shaft, all of which are enclosed within a hermetically sealed shell. An exterior motor lead provides power to the motor through a terminal block positioned in an aperture of the shell. If the motor lead is not restrained, vibrations from the motor and the compressor can cause the motor lead to rub against the housing and eventually wear through the insulation surrounding the motor lead, adversely affecting the operation of the motor and the compressor. In the past a spiral nylon wrap has been wound around the motor lead to protect the motor lead. This spiral wrap is expensive, time consuming to install, and only postpones the problem, since the motor lead can still move about and abrade.

Previous restraints have been permanently attached to the compressor by welding or some similar manner. Additionally, previous restraints have required the motor lead to be manually threaded through a tube or ring.

U.S. Pat. No. 4,396,359 to Kropiwnicki shows in FIG. 1 an unnumbered vertical tube which is flared at its upper end. The tube is permanently bonded to the motor housing and encloses the motor leads only after the leads have been manually directed through the tube.

U.S. Pat. No. 4,236,092 to DiFlora shows a small clip which is bonded to the motor cover in some manner and which secures the stator winding leads. Some manual effort is involved in the placement of the leads and the securing of the clip.

FIG. 1 of U.S. Pat. No. 3,462,075 to Dirk shows a flexible tube enclosing the motor leads where the tube is sealingly engaged with an aperture in the motor end cap. Again, considerable manual effort is involved in locating the leads within the tube and the tube within the aperture.

In summary, all of the foregoing are expensive, cumbersome in the installation of the restraint device within the compressor, and cumbersome in the attachment of the motor leads to the restraint device. Additionally, the motor lead must be manually passed through the restraint device.

OBJECT OF THE INVENTION

It is an object of the invention to solve the problems of the prior art compressor motor lead restraints.

It is a further object and advantage of the present invention to provide an inexpensive and easily installed motor lead restraint for a hermetically sealed motor compressor in a refrigeration system.

It is an object and an advantage of the present invention that the motor lead restraint is set in place without the necessity of bonding materials.

It is an object and an advantage of the present invention that the motor lead need not be manually threaded through the restraint device.

The present invention provides a method of trapping a piece in a void formed between two machine parts of a refrigeration system compressor and restraining a motor lead comprising the steps of: placing the piece in a portion of the void formed by a first machine part; completing the void by engaging a second machine part to the first machine part thereby trapping the piece; and attaching a motor lead to an external restraint portion of the piece.

The present invention also provides a method of attaching a motor lead restraint to a motor housing of a refrigeration system comprising the steps of: placing a restraint device in a restraint slot of a motor housing; interlocking the restraint device in place by juxtaposing a stator to the motor housing; engaging a motor lead restraint with a restraint portion of the restraint device; and enclosing the stator, the restraint device, the motor lead and the motor housing within a compressor shell.

The present invention further provides a system for restraining a motor lead in a hermetic compressor of a refrigeration system. The system comprises a restraint device including a restraining portion and a tenon portion. The tenon portion has a tenon end and a tenon base where the tenon end is broader in a radial dimension than the tenon base. The system includes a motor housing rotatably supporting a rotor and rigidly supporting a stator at a top end of the motor housing. The motor housing includes a mortise open at the top end of the motor housing and having a slot portion open at the exterior surface of the motor housing, where the mortise has substantially the same dimensions as the tenon portion. A frame supports the motor housing and encloses a compressor operably connected to the rotor. The system also includes a compressor shell including an aperture sealed by a terminal block where the shell enclosing the frame, the motor housing, and the restraint device, and the shell supports the frame. Additionally, the system includes a motor lead connected to the stator at a first end and to the terminal block at a second end. The tenon portion of the restraint device is placed in the mortise during assembly of the compressor and interlocked in place when the stator is rigidly engaged at the top end of the motor housing. During operation of the compressor the restraining portion of the restraint device is disposed to engage and restrain an intermediate portion of the motor lead.

The present invention provides a method of restraining a motor lead of a hermetically sealed refrigeration compressor unit comprising the steps of: forming a mortise in a motor housing where the mortise is open at an exterior surface of the motor housing and open at a top end of the motor housing, the mortise being wider at a subsurface portion of the motor housing than at the exterior surface of the motor housing; inserting a tenon portion of a restraint device into the mortise, where the tenon portion has substantially the same dimensions as the mortise; juxtaposing a stator to the top of the motor housing thereby interlocking the restraint device in place; engaging a motor lead with a restraining portion of the restraint device projecting above the exterior surface of the motor housing; and hermetically enclosing the stator, the restraint device, the motor housing, and the motor lead within the hermetic shell of a compressor unit.

DETAILED DESCRIPTION

Figure 1:
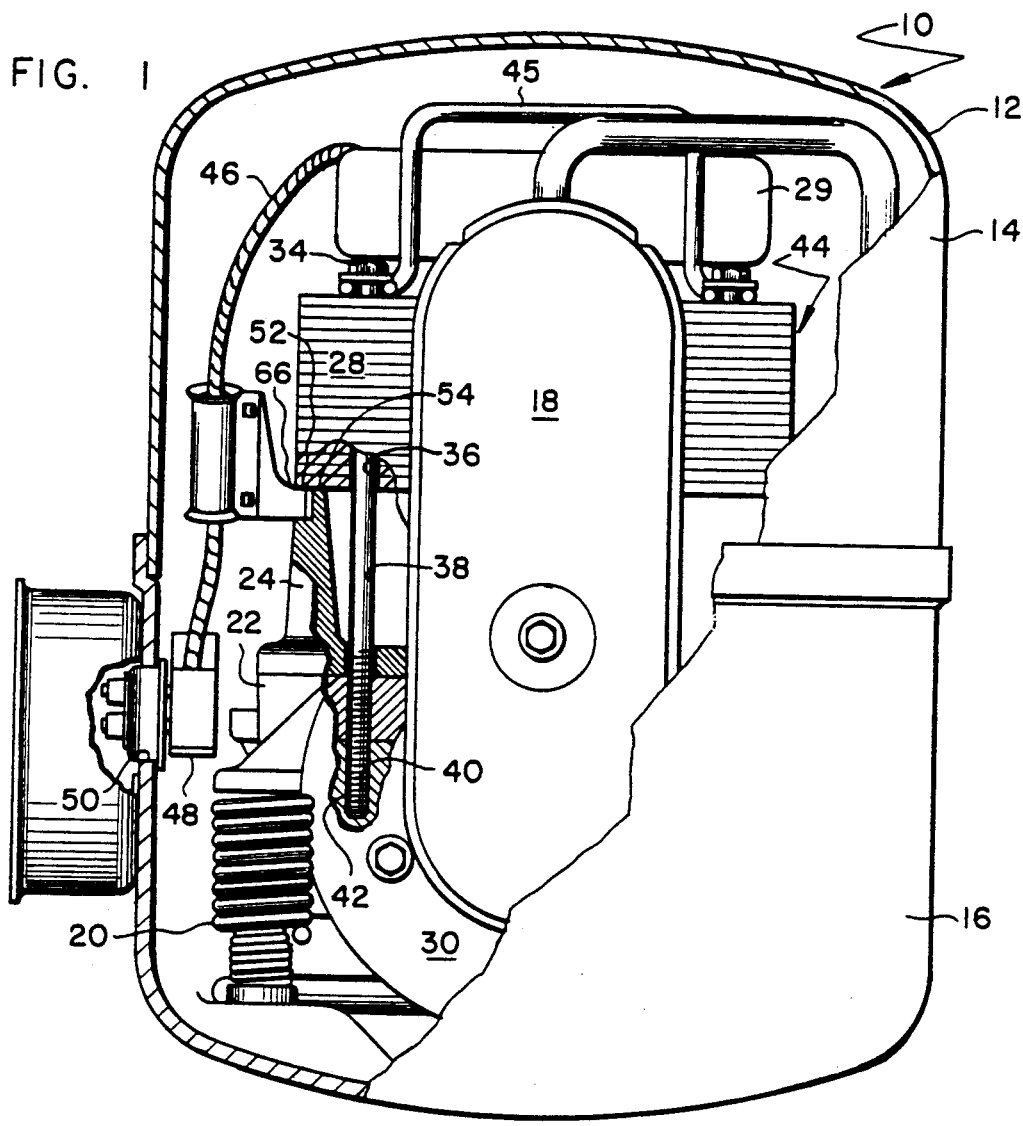
FIG. 1 is a plan view of a hermetic compressor housing including a motor lead restraint according to the present invention.

FIG. 1 shows a hermetic compressor 10 which incorporates the present invention. The compressor 10 includes a shell 12 usually formed from an upper half 14 and a lower half 16. A motor compressor assembly 18 is mounted within the shell 12 by several vibration absorbers 20.

The motor compressor assembly 18 includes a cylindrical frame 22 which is supported by the vibration absorbers 20 and which in turn supports a motor housing 24. The motor housing 24 encloses a rotor 26 and rigidly supports a stator 28. A compressor 30 is supported by the cylindrical frame 22 and shares a common shaft 32 with the rotor 26. The motor compressor assembly 18 is formed when the stator 28, the motor housing 24 and the cylindrical frame 22 are secured together by bolts 34. The bolts 34 each pass through a stator bore 36, a motor housing hole 38, and a cylindrical frame bore 40. The bolts are engaged within the cylindrical frame 22 by threads 42 within the bore 40. The bolts 34 also restrain a stator end turn portion 29 of the stator 28 by means of a wire clip 45.

A motor 44 includes the stator 28, the stator end turn 29 and the rotor 26, and is supplied with power by a motor lead 46. The motor lead 46 electrically connects the stator 28 and the stator end turn 29 to a terminal block 48 located in an aperture 50 of the shell 12. An exterior power supply supplies power to the motor 44 through the terminal block 48.

Figure 2:
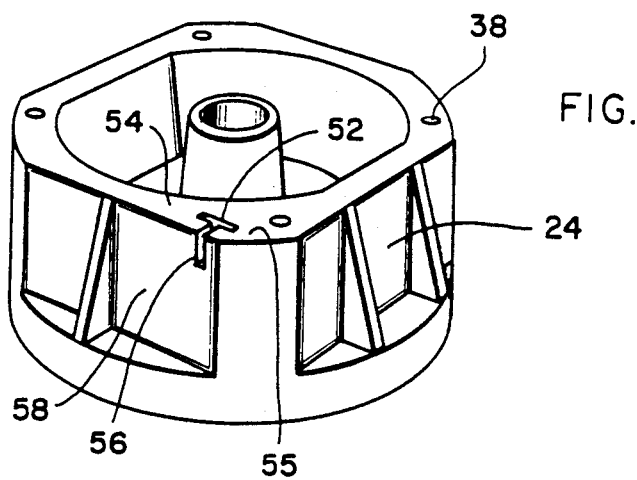
FIG. 2 is a perspective view of the motor housing and the restraint slot according to the invention.
Figure 3:
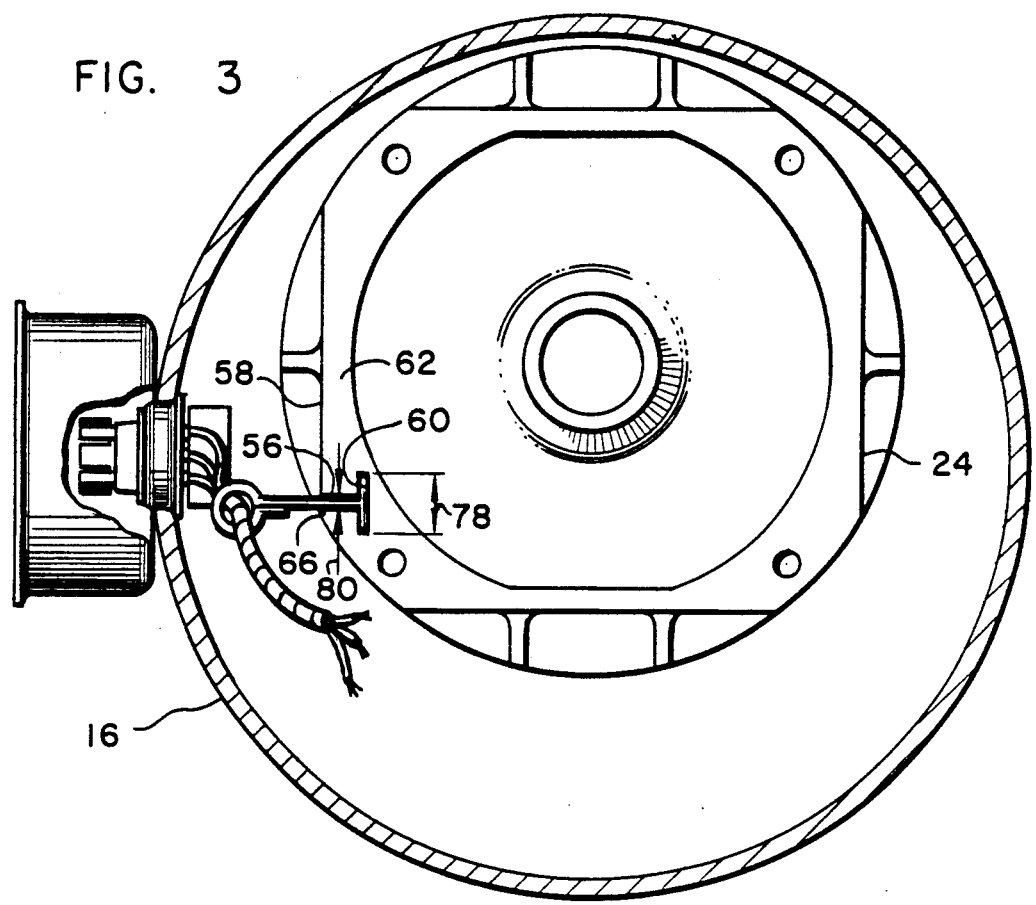
FIG. 3 is a top partial view of the motor housing, the motor lead, the restraint device, and the terminal block according to the present invention.

In the present invention as best shown in FIGS. 2 and 3, the motor housing 24 is cast with a restraint slot or a mortise 52 located at an upper edge 54 of the motor housing 24. In the preferred embodiment, the mortise 52 is located at a widened portion 55 of the motor housing 24. The mortise 52 includes a trench like slot 56 in an external surface 58 of the motor housing 24 which penetrates to an enlarged subsurface cavity or recess 60 within the wall 62 of the motor housing 24. Both the slot 56 and the cavity 60 are open at the upper edge 54 of the motor housing 24 so that a tenon portion 64 (see FIG. 7) of a motor lead restraint 68 having substantially the same dimensions as the mortise 52 can be inserted into the mortise 52. Once the tenon 64 has been received by the mortise 52, and the stator 28 has been bolted in place upon the motor housing 24, the mortise 52 and the tenon 64 form an interlocking joint 66 which retains the motor lead restraint 68 in place.

Figure 7:
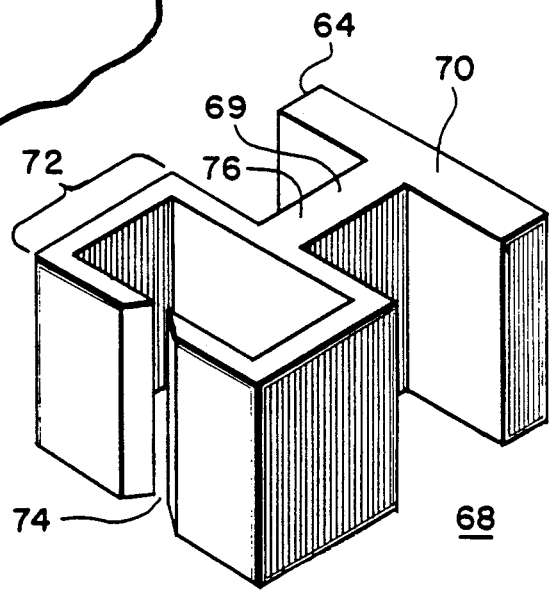
FIG. 7 is a motor lead restraint according to the invention.

As shown in FIG. 7, the motor lead restraint 68 includes two parts, firstly, the tenon 64 having a tenon base 69 and a tenon end 70, and secondly, a restraint portion 72 having a guide slot 74. In the preferred embodiment, the tenon base 69 includes a tenon base extension 76 which connects the restraint portion 72 to the tenon 64.

The tenon base 69 has substantially the same dimensions as the mortise slot 56, and the tenon end 70 has substantially the same dimensions as the mortise recess 60. The shape of the mortise 52 and the tenon 64 are unimportant with the exception that the mortise recess 60 and the tenon end 70 must be broader in a transverse dimension to the direction of the trench-like slot 56. For example as shown in FIG. 3, in the preferred embodiment the transverse dimension is a radial dimension 78 which is broader than the corresponding radial dimension 80 of the trench-like slot 56 and the tenon base 68.

Figure 4:
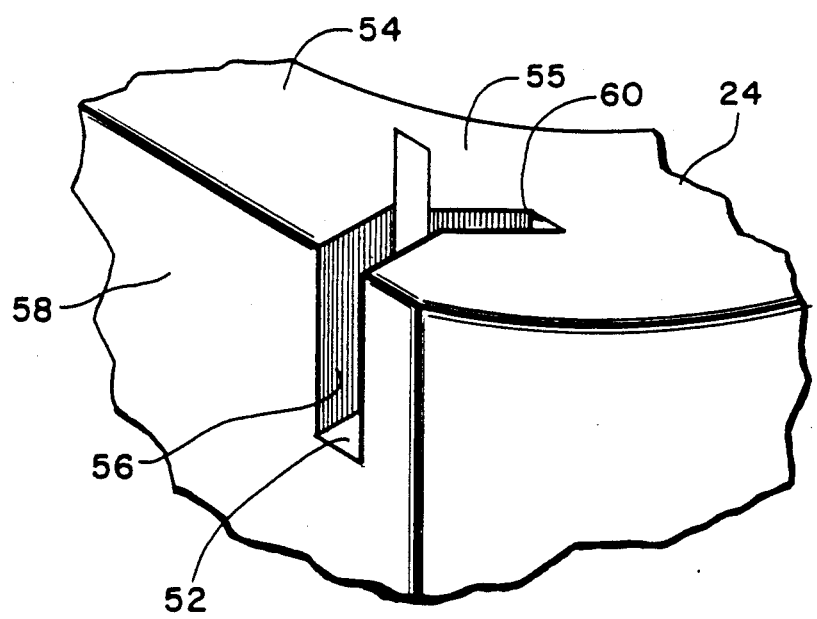
FIG. 4 is a further embodiment of the restraint slot according to the invention.
Figure 5:
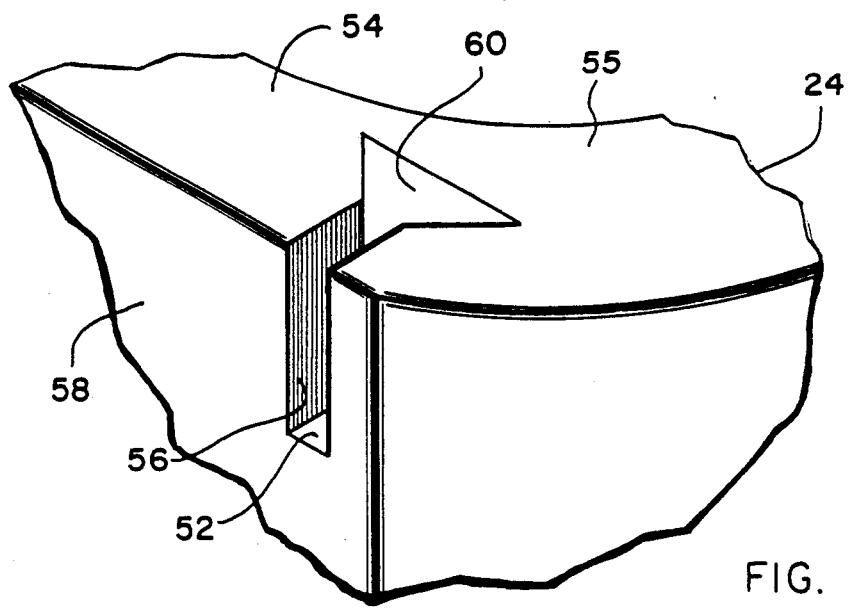
FIG. 5 is a further embodiment of the restraint slot according to the invention.
Figure 6:
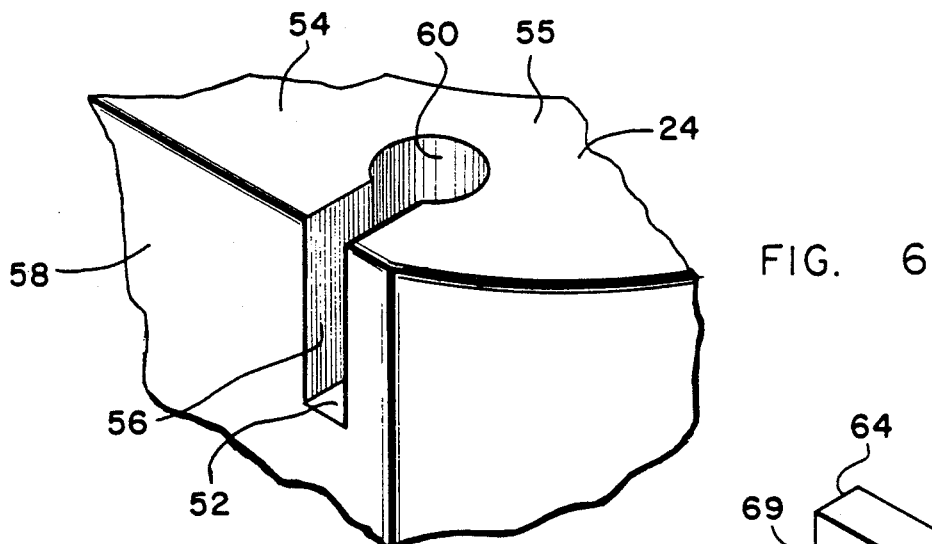
FIG. 6 is a further embodiment of the restraint slot according to the invention.

A multiplicity of shapes meet this requirement including the "T" shape of the preferred embodiment shown in FIGS. 2 and 3, as well as the "Y" shape shown in FIG. 4, the "dovetail" shape shown in FIG. 5, and the "key hole" shape shown in FIG. 6. Other shapes meeting the requirement include an "arrowhead", a truncated "diamond" or "triangle", and an "umbrella" shape. The conventional and reversed forms of such nonsymmetrical shapes as a "7" also meet this requirement.

Figure 8:
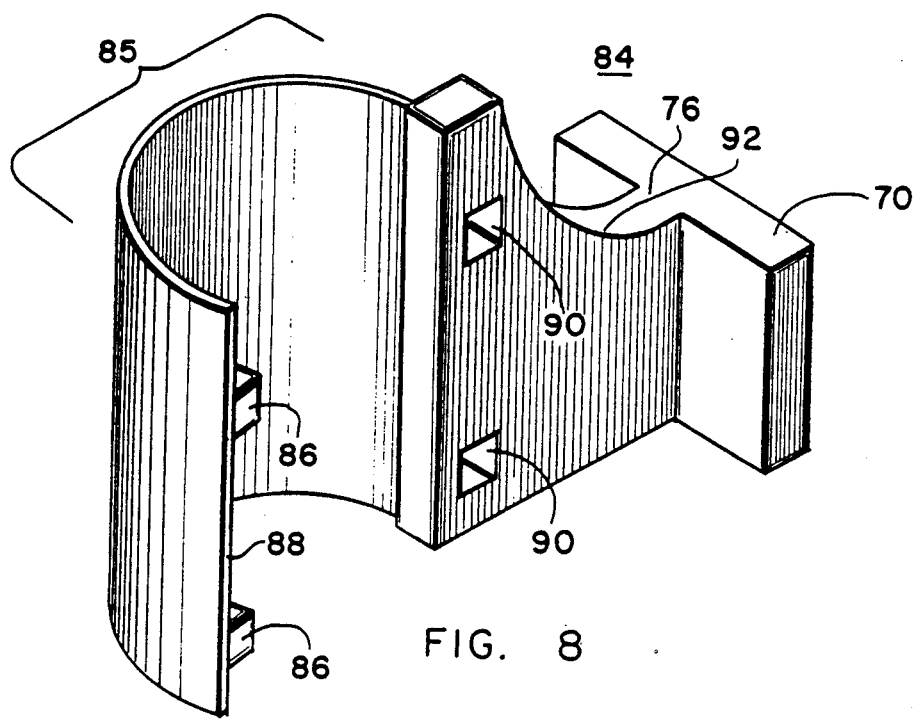
FIG. 8 is a further embodiment of a motor lead restraint according to the invention.

The restraining portion 72 of the motor lead restraint 68 has a guide slot 74 in the preferred embodiment shown in FIG. 7 which allows the motor lead 46 to be snapped into the restraint portion 72 and thereafter retained. A number of alternative restraining portions 72 are contemplated including the alternative preferred embodiment shown in FIG. 8 where the motor lead 46 is placed within an elongated restraint portion 84. The elongated restraint portion 84 includes base 92 connected to the extension 76, an intermediate portion 85 which is adapted to enclose the motor lead 46, and a free end 88. The elongated restraint portion 84 includes fastener clips 86 positioned on the free end 88 to engage retaining holes 90 in the base 92. The intermediate portion 85 will enclose and restrain the motor lead 46 after the elongated restraint portion 84 is wrapped around the motor lead 46. In an alternative version of FIG. 8, the retaining holes 90 may be positioned on the free end 88 of the elongated restraint portion 84 and the fastener clips 86 located on the base 92.

Figure 9:
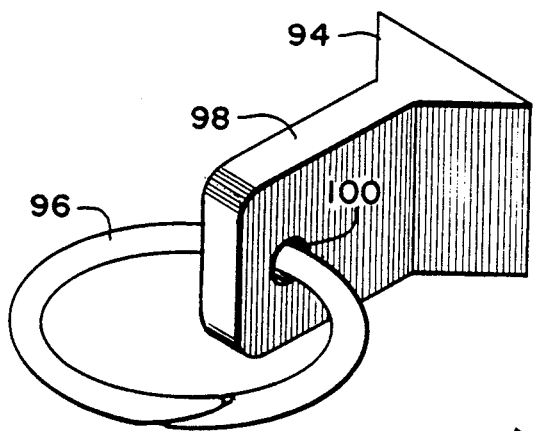
FIG. 9 is an alternative embodiment of a motor lead restraint according to the invention.
Figure 10:
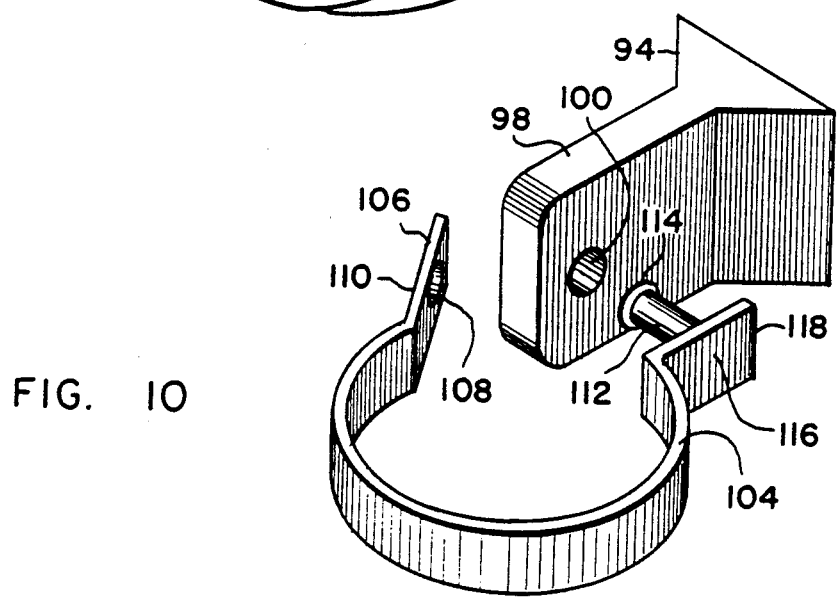
FIG. 10 is an alternative embodiment of a motor lead restraint according to the invention.

FIGS. 9 and 10 show a further alternative embodiments of the motor lead restraint 68 which are formed in two parts. During assembly. a tenon 94, shown in this example for interlocking with the dovetail mortise of FIG. 5, is inserted in the motor housing 24 and is interlocked in place by the stator 28 as discussed above In the embodiment shown in FIG. 9, a spiral ring 96 encircles the motor lead 46 and is attached to a base 98 of the tenon 94 through an aperture 100 in the tenon base 98. In the embodiment of FIG. 10, the same tenon 94 shown in FIG. 9 is used, but an incomplete or open ring 104 replaces the spiral ring 96. The incomplete ring 104 has a flat portion 106 with a snap fit aperture 108 at a first end 110, and a pin 112 with an enlarged head 114 at a flattened portion 116 of a second end 118. The incomplete ring 104 encircles the motor lead 46 and the pin 112 is passed through the tenon aperture 100 and thereafter through the snap fit aperture 108 so that the enlarged head 114 prevents the pin 112 from disengaging. The restraining portion 72 may also be formed as a solid ring (not shown). However, the solid ring has the substantial disadvantage that the motor lead 46 must be manually threaded through the solid ring.

The invention has been described above in terms of a void between two machine parts where the void is wider below the external surface of the machine parts than at the external surface of the machine parts. A fastener device with a portion which substantially fills the void is interlocked in place by the assembly of the machine parts, and used to retain a motor lead. Ideally, the motor lead is placed into a restraint portion of the fastener device without the necessity of manually threading the motor leads through the restraint portion.

Although the preferred embodiments are described above, it will be apparent that many alterations and modifications may be made without departing from the subject invention. It is intended that all such alterations and modifications be considered as within the spirit and scope of the invention as defined in the following claims.

What is claimed and desired to be secured by Letters Patent of the United States is:

1. A method of trapping a piece in a void formed between two machine parts of a refrigeration system compressor and restraining a motor lead comprising the steps of:
    placing said piece in a portion of the void formed by a first machine part;
    completing the void by engaging a second machine part to the first machine part thereby trapping the piece; and
    attaching the motor lead to an external restraint portion of said piece.

2. The method of claim 1 including the further step of forming the portion of the void in the first machine part such that the void has a slot portion and a subsurface portion, where the slot portion is open to an external surface of the first machine part after the void is formed and is smaller in a dimension transverse to the direction of the slot than the corresponding dimension of the subsurface portion.

3. The method of claim 2 wherein the step of forming the void includes forming the void in the shape of a T where the base of the T is formed by said slot portion.

4. The method of claim 3 wherein the step of forming the void includes the further step of casting the void in the first machine part.

5. The method of claim 1 wherein the step of attaching the motor lead includes the further step of placing the motor lead into the restraint portion without manually threading the motor lead through the restraint portion.

6. A method of attaching a motor lead restraint to a motor housing of a refrigeration system comprising the steps of:
    placing a restraint device in a restraint slot of a motor housing;
    interlocking the restraint device in place by juxtaposing a stator to the motor housing;
    engaging the motor lead with a restraint portion of the restraint device; and
    enclosing the stator, the restraint device, the motor lead and the motor housing within a compressor shell.

7. A system for restraining a motor lead in a hermetic compressor of a refrigeration system comprising:
    a restraint device including a restraining portion and a tenon portion, the tenon portion having a tenon end and a tenon base where the tenon end is broader in a radial dimension than the tenon base;
    a motor housing rotatably supporting a rotor and rigidly supporting a stator at a top end of the motor housing, the motor housing including a mortise open at the top end of the motor housing and having a slot portion open at the exterior surface of the motor housing, where the mortise has substantially the same dimensions as the tenon portion;
    a frame supporting the motor housing and enclosing a compressor operably connected to the rotor;
    a compressor shell including an aperture sealed by a terminal block, the shell enclosing the frame, the motor housing, and the restraint device, and the shell supporting the frame; and
    the motor lead connected to the stator at a first end, and to the terminal block at a second end;
    whereby the tenon portion of the restraint device is placed in the mortise during assembly of the compressor and interlocked in place when the stator is rigidly engaged at the top end of the motor housing, and during operation of the compressor the restraining portion of the restraint device has been disposed to engage and restrain an intermediate portion of the motor lead.

8. The system of claim 7 wherein the mortise and the tenon portion have dimensions in the shape of a "T".

9. The system of claim 7 wherein the mortise and the tenon portion have dimensions in the shape of a "Y".

10. The system of claim 7 wherein the mortise and the tenon portion have dimensions in the shape of a "dove tail".

11. The system of claim 7 wherein the mortise and the tenon portion have dimensions in the shape of a "key hole".

12. The system of claim 7 wherein the restraining portion of the restraint device includes a guide slot adapted to receive and retain the motor lead.

13. The system of claim 7 wherein the restraining portion of the restraint device includes an elongated portion connected to the tenon portion at a first end, an intermediate portion adapted to encircle the motor lead, a second free end, and means to engage the first end with the second free end.

14. The system of claim 13 wherein the engagement means includes at least one fastener clip on the second free end and an aperture on the first end.

15. The system of claim 13 wherein the engagement means includes at least one fastener clip on the first end and at least one mating aperture on the second free end.

16. The system of claim 7 wherein the restraint device is a unitary device.

17. The system of claim 7 wherein the restraint device includes a restraint portion which is physically distinct from the tenon portion.

18. The system of claim 17 wherein the tenon portion includes at least one aperture in the tenon base.

19. The system of claim 18 wherein the restraining portion includes a spiral ring adapted to engage the aperture in the tenon base.

20. The system of claim 18 wherein the restraining portion includes an open ring having a pin at a first ring end adapted to engage a snap fit aperture on a second ring end through the aperture in the tenon base.

21. The system of claim 7 wherein the restraining portion includes a solid ring adapted to encircle the motor lead.

22. A method of restraining a motor lead of a hermetically sealed refrigeration compressor unit comprising the steps of:

forming a mortise in a motor housing where the mortise is open at an exterior surface of the motor housing and open at a top end of the motor housing, the mortise being wider at a subsurface portion of the motor housing than at the exterior surface of the motor housing;

inserting a tenon portion of a restraint device into the mortise, where the tenon portion has substantially the same dimensions as the mortise;

juxtaposing a stator to the top of the motor housing thereby interlocking the restraint device in place;

engaging a motor lead with a restraining portion of the restraint device projecting above the exterior surface of the motor housing; and hermetically enclosing the stator, the restraint device, the motor housing, and the motor lead within the hermetic shell of a compressor unit.

* * * * *